A. BARR & W. STROUD.
INSTRUMENT FOR ADJUSTING RANGE FINDERS.
APPLICATION FILED OCT. 24, 1907.
933,873.
Patented Sept. 14, 1909.
3 SHEETS—SHEET 1.
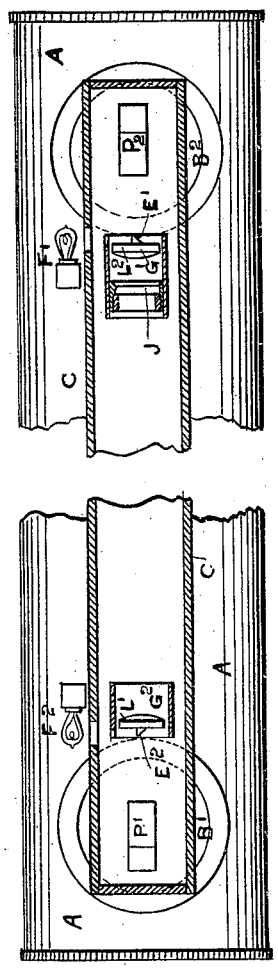
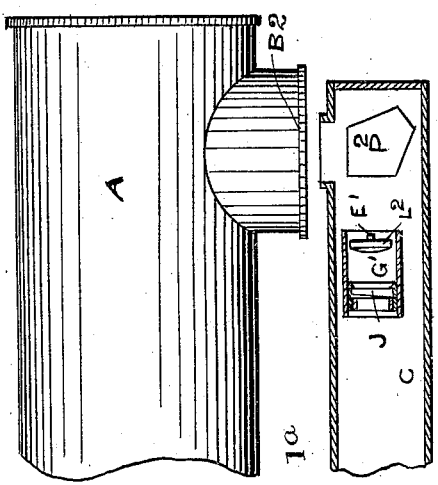
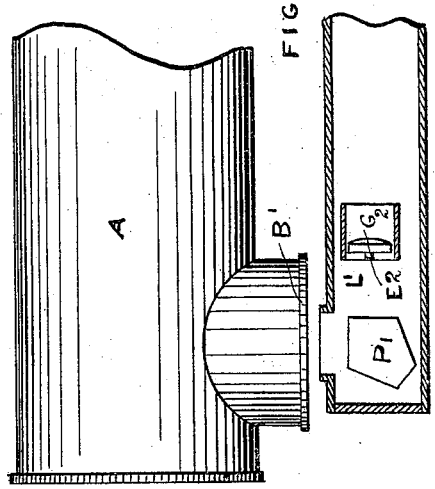

A. BARR & W. STROUD.
INSTRUMENT FOR ADJUSTING RANGE FINDERS.
APPLICATION FILED OCT. 24, 1907.
933,873.
Patented Sept. 14, 1909.
3 SHEETS—SHEET 2.
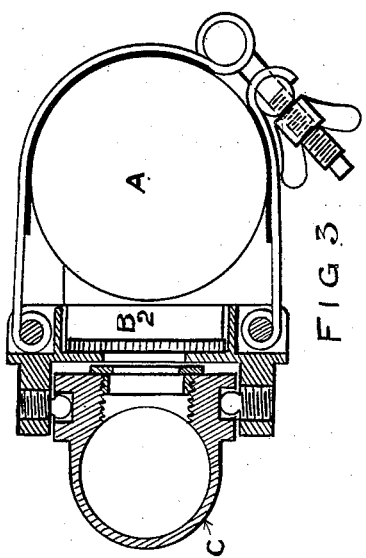
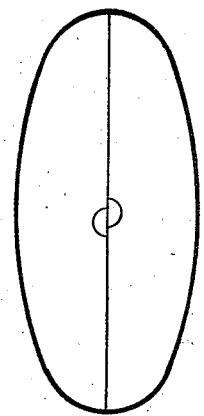
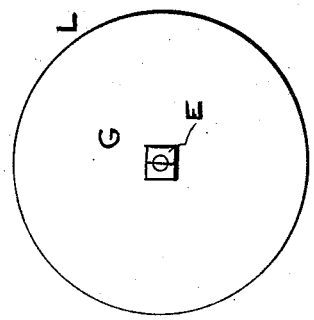
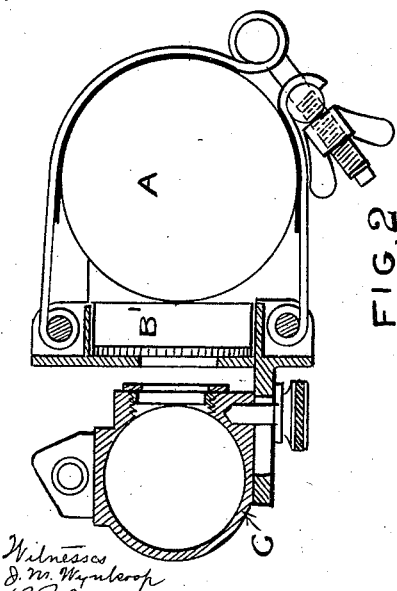
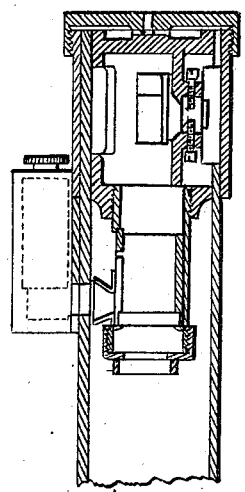
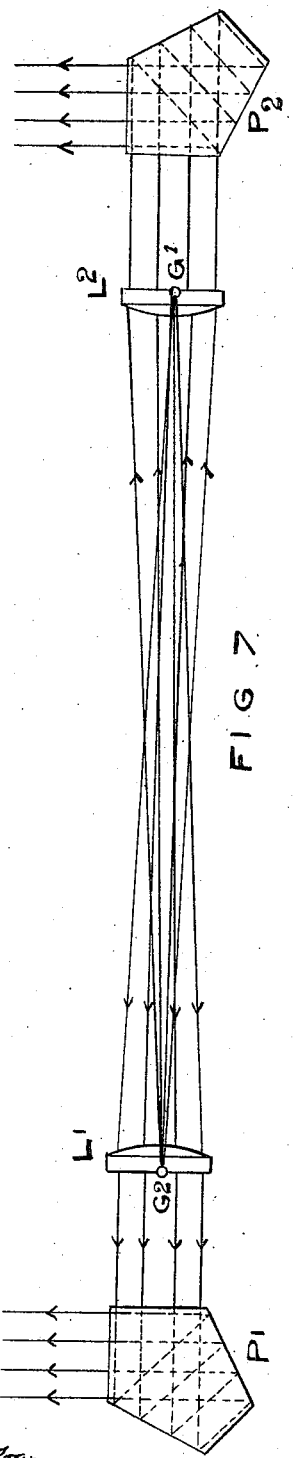

A. BARR & W. STROUD.
INSTRUMENT FOR ADJUSTING RANGE FINDERS.
APPLICATION FILED OCT. 24, 1907.
933,873.
Patented Sept. 14, 1909.
3 SHEETS—SHEET 3.
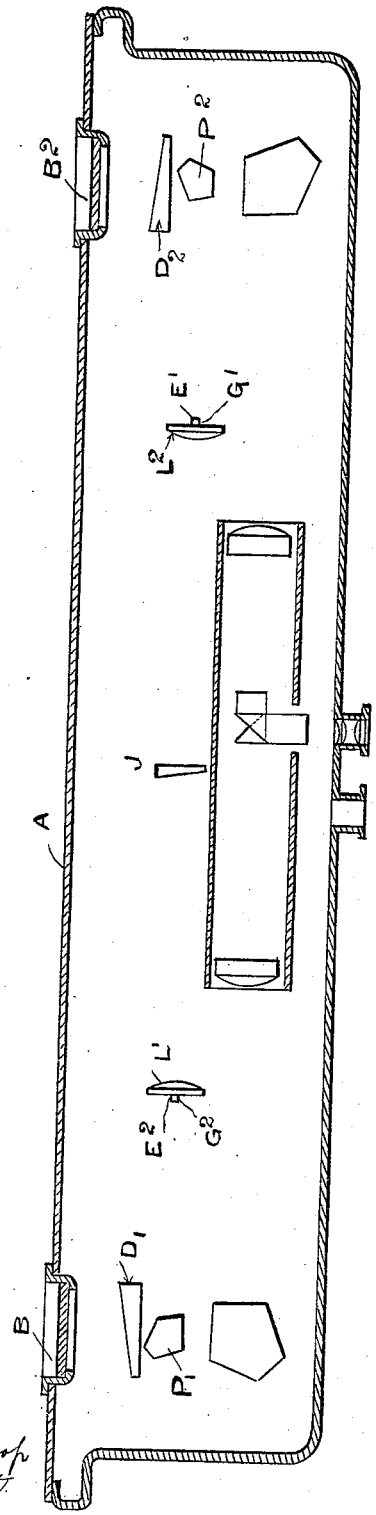
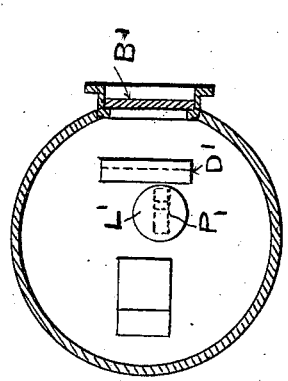

UNITED STATES PATENT OFFICE.

ARCHIBALD BARR, OF GLASGOW, SCOTLAND, AND WILLIAM STROUD, OF LEEDS, ENGLAND.

INSTRUMENT FOR ADJUSTING RANGE-FINDERS.

933,873.  Specification of Letters Patent.   Patented Sept. 14, 1909.

Application filed October 24, 1907.  Serial No. 399,016.

*To all whom it may concern:*

Be it known that we, ARCHIBALD BARR, of Glasgow, Scotland, and WILLIAM STROUD, of Leeds, England, have invented certain new and useful Improvements in Instruments for Adjusting Range-Finders, of which the following is a specification.

Our invention relates to means for adjusting rangefinders and the object of our invention is to provide appliances in connection with single observer rangefinders working on either the coincidence or stereoscopic principle, to enable the operator to put the rangefinder into correct adjustment, when necessary, without observing upon a celestial object or an object whose range is known. This we accomplish in the following manner:—We provide (1) two lenses $L^1$ and $L^2$ of equal or nearly equal focal length upon each of which a fine line, or other suitable mark, is made, and (2) a pair of optical squares, $P^1$ and $P^2$. The two lenses are mounted up at a distance apart equal to their common focal length. The line upon $L^1$ (suitably illuminated) is thus situated at the principal focal plane of $L^2$, and the line upon $L^2$ (also illuminated) is situated at the principal focal plane of $L^1$. Thus the light coming from a point of the mark upon $L^1$ will furnish a parallel beam of light emerging from $L^2$, and similarly that coming from a point of the mark upon $L^2$ will furnish a parallel beam of light emerging from $L^1$. We shall suppose at first that the marks are so placed on the lenses that the central axes of these beams of light are parallel to one another—a condition which would be satisfied if the points referred to coincided with the optical centers of the lenses. If this is the case then the two emerging beams will still remain parallel, notwithstanding any small shift of the lenses $L^1$ or $L^2$ in the plane at right angles to the principal axes of the lenses. To enable these parallel beams of light to enter the rangefinder, one of the optical squares $P^1$ is placed opposite a portion of one end-reflector of the rangefinder and the other $P^2$ opposite a portion of the other end-reflector, and the two lenses $L^1$, $L^2$, are so placed relatively to the optical squares that light coming from the mark on $L^1$ emerges as a parallel beam from the lens $L^2$, and is turned through 90° by the optical square $P^2$, and finally enters the end-reflector of the rangefinder; similarly light coming from the mark on $L^2$ emerges as a parallel beam from the lens $L^1$, and is then turned through 90° in the optical square $P^1$, and finally enters the other end-reflector of the rangefinder. If, as we have supposed the central axes of these beams are parallel to one another, then the beams of light entering the rangefinder will virtually come from one point at infinity, in other words we are provided with an artificial infinity. The marks may conveniently take the form of lines on the lenses, at right angles to the plane of triangulation of the rangefinder. Even if these lines are so placed that the beams from them are not parallel to each other in the plane of triangulation on emerging from the lenses, we still have the equivalent of one line situated at a given distance from the rangefinder. In some cases the marks may not be made directly on the lenses $L^1$ and $L^2$, but may be securely attached to the lenses. We may sometimes insert in the path of the beams a refracting prism of suitable angle capable of rotation about an axis perpendicular to its face or nearly so. Such rotation will produce an alteration of the angle between the central axes of the two beams in the plane of triangulation and can therefore be used to adjust the two beams so as to be parallel in the plane of triangulation and thus to produce an artificial infinity even if the marks on the lenses are not coincident with the optical centers of the lenses, or if the optical squares $P^1$ and $P^2$ do not set out angles of exactly 90°.

The various parts of this adjusting instrument may be mounted on a separate frame detachable from the rangefinder when not in use, or any of the various parts may be attached to the framework of the rangefinder itself.

In some types of rangefinders and in some arrangements of the parts of the adjuster the adjusting marks will appear in coincidence only when the operating mechanism of the rangefinder is set to read "infinity" or other chosen range, in other cases the arrangement may be such that the marks will appear in coincidence whatever the rangefinder be set to read, if the rangefinder is in correct adjustment.

In order that the nature of our invention and the manner in which the same may be performed may be more clearly and fully understood, we shall now describe it with reference to the accompanying drawings and to the letters and marks thereon.

Figure 1 is an elevation and Fig. 1ª is a plan of a rangefinder with the adjusting instrument in position relatively thereto. Fig. 2 and Fig. 3 are cross sections of the rangefinder and adjusting instrument. Fig. 4 is a sectional elevation of one end portion of the adjusting instrument. Fig. 5 is an enlarged view of one of the objectives and of the adjusting instrument with the mark thereon. Fig. 6 is a diagram illustrating the appearance presented in the rangefinder field when the rangefinder is not in accurate adjustment. Fig. 7 is a diagram illustrating the optical principle of the instrument. Figs. 8 and 9 show the adjusting device incorporated with a rangefinder.

The figures (except Figs. 8 and 9) show how an adjuster of the type at present being described can be used as an adjunct to a rangefinder, but as will be explained below the adjuster may be incorporated in the same case as the rangefinder, and one example of this is illustrated in Figs. 8 and 9. In the first instance we shall suppose that the rangefinder works upon the coincidence principle.

In Figs. 1 to 4, A represents a rangefinder and C a tube containing the optical parts of the adjuster. A and C are shown broken to save room in the drawings. $B_1$ $B_2$ are the windows through which the beams of light from the distant object enter the range finder. C is a tube or framepiece carrying the optical parts of the adjuster. $L^1$ $L^2$ are two lenses or objectives of equal focal length, or very nearly so, set at a distance apart equal to their focal length, or nearly so. $E_1$ and $E_2$ are small reflecting prisms sending beams of light from lamps $F_1$ $F_2$ (or other sources of light), through the objectives, which carry, opposite the prisms $E_1$ $E_2$, marks $G_1$ $G_2$ conveniently consisting of vertical lines and circles as shown in Fig. 5, though the type of marks used may be varied as may be found convenient. The marks may conveniently be cut on films of black varnish covering a small part of one surface of each objective so as to show as bright lines in the field of the rangefinder, but they may be formed in any other manner so long as they are fixed relatively to the objectives to which they are contiguous. $P_1$ $P_2$ are optical squares represented as being of the Prandl prism form though other forms may be used.

The principle of the instrument will be understood by reference to Fig. 7. The mark $G_1$ (considered as a point) being set at the principal focus of the lens $L_1$ and illuminated by light from the lamp $F_1$ (Figs. 1 and 4) reflected by the prism $E_1$ (Figs. 1, 1ª, and 4) will emit a beam of divergent rays which are rendered parallel, or nearly so, by the lens $L_1$, and so are transmitted by the optical square $P_1$ to the rangefinder as if the rays came from a very distant object. A similar beam of light enters the other end of the rangefinder from the mark $G_2$, the objective $L_2$ and the optical square $P_2$. It will be seen that if the parts are suitably arranged relatively to each other the two beams, entering the rangefinder by the windows $B_1$ $B_2$ will virtually come from one object of the form G set an infinite distance in front of the rangefinder, and thus constitute an "artificial infinity" by aid of which the adjustment of the range-finder may be tested, and by so adjusting the rangefinder that it reads "infinity" when the images of the marks are seen in correct alinement in the rangefinder field, the rangefinder may be put into correct adjustment. In Fig. 6, for clearness, the images are shown out of coincidence which will indicate that the rangefinder is not in correct adjustment if the rangefinder scale is meantime indicating "infinity".

It is not essential that the beams entering the windows $B_1$ and $B_2$ should be parallel to each other; the optical parts of the adjuster may be set so that the beams virtually come from an object G set at any chosen virtual distance in front of the rangefinder, and so long as this virtual distance is known the rangefinder may be adjusted by making it read this virtual distance when the images of the marks are seen in correct alinement in the rangefinder field.

In some cases we place a refracting prism J of small angle of deviation in the paths of the beams between the two objectives. If the prism is rotated about the axis of the beams it causes the images of the marks $G_1$ $G_2$ to move relatively to each other in the rangefinder field. This prism therefore enables us to set the finder so that the virtual distance of the marks is truly "infinity" or other chosen distance, irrespective of any want of accurate setting of the other parts of the apparatus or any deviation of the angles set out by the optical squares $P_1$ $P_2$ from true right angles. After the adjuster has been so adjusted the prism J may be fixed. Should the marks $G_1$ $G_2$ be placed one to one side and the other to the other side of the centers of the objectives, the beams entering the range finder windows would still be parallel but oblique, so as to cause the image of the marks to appear to one side of the rangefinder field. The image may be brought into any suitable part of the rangefinder field by suitably setting the adjuster relatively to the rangefinder.

The adjuster will not be deranged by any small movements of either of the objectives $L_1$ $L_2$ relatively to the other parts of the apparatus. If for example the adjuster is arranged to indicate infinity and the objective $L_2$ carrying the mark $G_1$ with it, were moved nearer to the rangefinder in the plan (Fig 1ᵃ) it will be seen that this would cause the axis of the beam from $G_1$ through the optical center of the lens $L_1$ to take a direction somewhat oblique to the rangefinder but the optical center of the lens $L_2$ would be equally moved so that the axis of the beam from $G_2$ through the optical center of $L_2$ would take an equally oblique direction and thus the two beams emerging from the objectives would still be parallel to each other. Any small movement of the objectives $L_1$ $L_2$ or any bending of the adjuster tube C therefore produces no effect upon the virtual distance of the marks from the rangefinder.

In order to minimize any effect from temperature changes on the angles set out by the optical squares $P_1$ $P_2$ we prefer to make these of the Prandl prism form (as shown in Figs. 1ᵃ and 7) and to make them small compared with the reflectors of the rangefinder.

The adjuster may be so arranged that when in place it excludes all light from the rangefinder field except that coming through the adjuster. In other cases we may arrange that the optical squares of the adjuster come in front of portions only of the reflectors of the rangefinder so that the images of the marks may be visible in the rangefinder field while the rangefinder is being used to observe upon a real object.

In some rangefinders the appliances for effecting the deviation of one or both of the beams of light by which a distant object is viewed in the operation of the rangefinder, are placed outside the end reflectors. In such cases the optical squares of the adjuster may be set between such deviating appliances and the end reflectors of the rangefinder, and the apparent coincidence of the adjuster marks will not be affected by the working of the operating mechanism of the rangefinder. In this case, when the adjuster and rangefinder are once adjusted, the images of the marks should appear in coincidence whatever be the range indicated by the rangefinder scale. Figs. 8 and 9 represent such an arrangement. Corresponding parts of the adjuster are lettered in accordance with the description given above, and the operating prisms of the rangefinder are shown at $D_1$ $D_2$.

It will be obvious that the adjuster can be equally well applied to instruments working upon the stereoscopic principle. In this case the two images of the marks $G_1$ $G_2$ will be seen in the two eyepieces respectively and the rangefinder will be in correct adjustment when the virtual object G appears to be at the same distance as the reference marks in the rangefinder with which the apparent distance of an object is compared, the rangefinder scale being suitably set. Thus if the adjuster is placed outside of the rangefinder, and adjusted to give an artificial infinity, the virtual object G should appear to be at the same distance as the reference marks when the rangefinder scale reads infinity. In the case of a stereoscopic rangefinder, as in that of a coincidence rangefinder, the adjuster may be set to make the virtual object G be at any desired virtual distance from the rangefinder, when the virtual object G and the reference marks used in the rangefinder should appear to be at the same distance when the rangefinder scale is set to read the distance of the virtual object G.

Claims.

1. In an instrument for adjusting range finders, the combination of two objectives of approximately the same focal length and provided with suitable marks; and a pair of optical squares whereby beams of light are conveyed from the marks to the rangefinder.

2. In an instrument of the character described, the combination of an adjuster provided with two objectives; and a refracting prism mounted between said objectives and adapted to be rotated about an axis coincident with the axis of the beams of light passing between the objectives.

In witness whereof we have hereunto set our hands in the presence of two witnesses.

ARCHIBALD BARR.
WILLIAM STROUD.

Witnesses:
JOHN LIDDLE,
JOHN T. LIDDLE.